United States Patent
Jeong et al.

(10) Patent No.: US 10,598,923 B2
(45) Date of Patent: Mar. 24, 2020

(54) HYBRID TWO-DIMENSIONAL (2D) SCANNER SYSTEM AND METHOD OF OPERATING THE SAME

(71) Applicant: SAMSUNG ELECTRONICS CO., LTD., Suwon-si (KR)

(72) Inventors: Byunggil Jeong, Anyang-si (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 159 days.

(21) Appl. No.: 15/818,279

(22) Filed: Nov. 20, 2017

(65) Prior Publication Data

US 2019/0004312 A1 Jan. 3, 2019

(30) Foreign Application Priority Data

Jul. 3, 2017 (KR) .......................... 10-2017-0084405

(51) Int. Cl.
*G02B 26/10* (2006.01)
*G01S 7/481* (2006.01)
*G02B 26/08* (2006.01)
*G02B 26/06* (2006.01)
*G01S 17/42* (2006.01)
*G01S 7/499* (2006.01)

(52) U.S. Cl.
CPC .......... *G02B 26/101* (2013.01); *G01S 7/4817* (2013.01); *G01S 17/42* (2013.01); *G02B 26/06* (2013.01); *G02B 26/085* (2013.01); *G02B 26/0841* (2013.01); *G02B 26/0858* (2013.01); *G01S 7/499* (2013.01)

(58) Field of Classification Search
None
See application file for complete search history.

(56) References Cited

U.S. PATENT DOCUMENTS

| | | | | |
|---|---|---|---|---|
| 2004/0165250 | A1* | 8/2004 | Aubuchon | G02B 26/0841 359/292 |
| 2010/0315938 | A1* | 12/2010 | Ascanio | B81B 7/0051 369/126 |
| 2012/0327502 | A1* | 12/2012 | Zheludev | G02B 1/002 359/291 |
| 2015/0378241 | A1 | 12/2015 | Eldada | |
| 2016/0245919 | A1 | 8/2016 | Kalscheur et al. | |
| 2016/0314602 | A1 | 10/2016 | Brady et al. | |
| 2017/0068319 | A1 | 3/2017 | Viswanathan | |

FOREIGN PATENT DOCUMENTS

KR   10-1527771 B1   6/2015

* cited by examiner

*Primary Examiner* — Jennifer D. Carruth
(74) *Attorney, Agent, or Firm* — Sughrue Mion, PLLC

(57) ABSTRACT

Provided are a hybrid two-dimensional (2D) scanner system and a method of operating the same. The hybrid 2D scanner system includes a meta-surface based one-dimensional (1D) scanner and a mechanical scanner connected to the meta-surface based 1D scanner. In this scanner system, the mechanical scanner is operated as a 1D scanner. For this purpose, one of two rotational axes included in the mechanical scanner is maintained in a fixed position during a scanning operation. The meta-surface based 1D scanner may include a base substrate, a meta-surface that is arranged on the base substrate and includes a channel array, and a power supply configured to apply a voltage to the channel array.

18 Claims, 5 Drawing Sheets

HYBRID TWO-DIMENSIONAL (2D) SCANNER SYSTEM AND METHOD OF OPERATING THE SAME

CROSS-REFERENCE TO RELATED APPLICATION

This application claims priority from Korean Patent Application No. 10-2017-0084405, filed on Jul. 3, 2017, in the Korean Intellectual Property Office, the disclosure of which is incorporated herein in its entirety by reference.

BACKGROUND

1. Field

Apparatuses and methods consistent with exemplary embodiments relate to scanner systems, and more particularly, to hybrid two-dimensional (2D) scanner systems and methods of operating the same.

2. Description of the Related Art

A light detection and ranging (LiDAR) system forms an image of a region after scanning the region using a laser beam. LiDAR systems typically use beam scanners which use a mechanically moving structure for scanning the laser beam over the region. An alternative scanner including a micro electromechanical system (MEMS) enables dual axis scanning by combining an electromagnetic scanning method and an electrostatic scanning method. Yet another alternative scanner includes a rotating beam reflector or a polygon mirror which rotate under the control of a motor and thereby scan a beam in various directions.

SUMMARY

One or more exemplary embodiments may provide hybrid two-dimensional (2D) scanner systems that have a relatively simple configuration and enable rapid scanning.

One or more exemplary embodiments may provide methods of operating the hybrid 2D scanner systems.

Additional exemplary aspects will be set forth in part in the description which follows and, in part, will be apparent from the description, or may be learned by practice of the presented exemplary embodiments.

According to an aspect of an exemplary embodiment, a hybrid 2D scanner system includes a meta-surface based one-dimensional (1D) scanner and a mechanical scanner connected to the meta-surface based 1D scanner.

The mechanical scanner may be operated as a 1D scanner.

The meta-surface based 1D scanner may include a base substrate, a meta-surface that is arranged on the base substrate and comprises a channel array and a power supply for applying a voltage to the channel array.

The channel array may include a plurality of channels to which the voltage is individually applied.

The power supply may include a voltage controller.

Each of the channels may include a first channel and a plurality of second channels that are perpendicular to the first channel and have a length shorter than that of the first channel.

The mechanical scanner may include two rotational axes and one of the rotational axes may be fixed.

The mechanical scanner may be an actuator that uses a piezoelectric material.

The mechanical scanner may be a MEMS type mechanical scanner in which an electromagnetic method and an electrostatic method are mixed, comprising at least one electromagnetic element and at least one electrostatic element.

The mechanical scanner may be an electromagnetic MEMS type mechanical scanner that uses a Lorentz force.

According to an aspect of another exemplary embodiment, a method of operating a hybrid 2D scanner system, the method includes operating a meta-surface based 1D scanner and operating a mechanical scanner connected to the meta-surface based 1D scanner, wherein the mechanical scanner includes two rotational axes, and one of the two rotational axes is stopped to use the mechanical scanner as a 1D scanner.

The meta-surface based 1D scanner may include a base substrate, a meta-surface that is arranged on the base substrate and comprises a channel array, and a power supply for applying a voltage to the channel array.

The channel array may include a plurality of channels and a voltage is individually applied to each of the channels.

Voltages different from each other may be applied to at least a portion of the channels.

BRIEF DESCRIPTION OF THE DRAWINGS the above and/or other exemplary aspects and advantages will become apparent and more readily appreciated from the following description of exemplary embodiments, taken in conjunction with the accompanying drawings in which.

DETAILED DESCRIPTION

Figure 1:
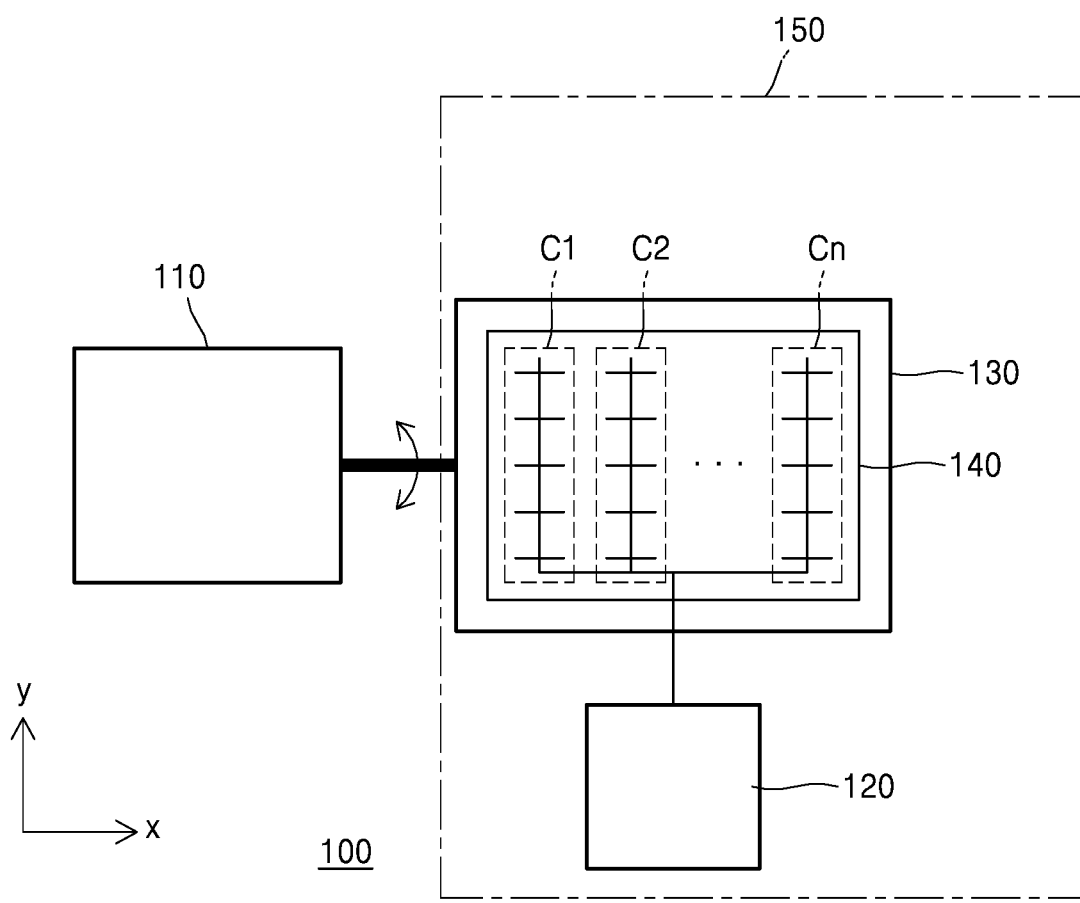
FIG. 1 is a plan view of a hybrid 2D scanner system according to an exemplary embodiment.

Exemplary embodiments will be described more fully hereinafter with reference to the accompanying drawings, in which various embodiments are shown. This invention may, however, be embodied in many different forms, and should not be construed as limited to the exemplary embodiments set forth herein. Rather, these embodiments are provided so that this disclosure will be thorough and complete Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the context clearly indicates otherwise. "At least one" is not to be construed as limiting to "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, exemplary embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hybrid 2D scanner systems and methods of operating the hybrid 2D scanner systems will now be described with reference to the accompanying drawings. The methods of operating the hybrid 2D scanner systems may be described in the processes of describing the hybrid 2D scanner systems.

FIG. 1 is a plan view of a hybrid 2D scanner system 100 according to an exemplary embodiment.

Referring to FIG. 1, the hybrid 2D scanner system 100 may include at least a mechanical scanner 110 and a meta-surface based 1D scanner 150. The mechanical scanner 110 may be connected to a rotational axis, for example an x-axis, of the meta-surface based 1D scanner 150. The mechanical scanner 110 may include an actuator to provide a rotational force to the meta-surface based 1D scanner 150 in a given direction. The mechanical scanner 110 may rotate the meta-surface based 1D scanner 150 in clockwise and counter-clockwise directions about the given axis, for example, the x-axis. The rotational range of the mechanical scanner 110 may be determined according to a region to be scanned. The mechanical scanner 110 may be a 1D actuator that is driven according to any of various methods. For example, the mechanical scanner 110 may be a piezoelectric actuator, an electrostatic actuator, or an electromagnetic actuator utilizing the Lorentz force.

The meta-surface based 1D scanner 150 is able to scan at a higher speed than the mechanical scanner 110. In the case of the mechanical scanner 110, scanning may be performed at a speed of, for example, a few kHz. However, in the case of the meta-surface based 1D scanner 150, scanning may be performed at a speed of, for example, a few GHz or more. Accordingly, the meta-surface based 1D scanner 150 may be used to scan a relatively a wide field of view (for example, in the direction of a wider dimension of the 2D scanning region), and the mechanical scanner 110 may be used to scan a relatively narrow field of view (for example, in the direction of a narrower dimension of the 2D scanning region). As a result of the meta-surface based 1D scanner 150 and the mechanical scanner 110 being used together, it is possible to scan faster than when only a related art mechanical scanner is used for the same scanning region. Furthermore, in the case of the hybrid 2D scanner system according to the current exemplary embodiment, a meta-surface based 1D scanner is used, and thus, resolution may be increased by controlling the number of channels.

Figure 2:
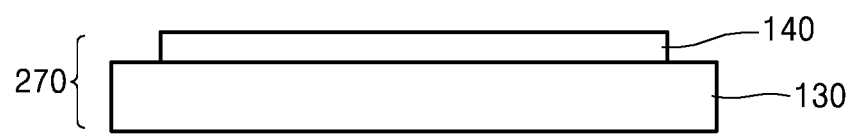
FIG. 2 is a lateral view (in a y-axis direction) of a base substrate and a meta-surface of a meta-surface based 1D scanner of FIG. 1.

When a voltage is applied to channels C1, C2 . . . and Cn (n=3, 4, 5 . . . ) of a meta-surface 140 of the meta-surface based 1D scanner, an optical phase difference between the channels C1, C2 . . . and Cn is generated. Accordingly, light (for example, a polarized light) incident on the meta-surface 140 is reflected within a given range, and as a result, a 1D scan may be achieved. The reflection range and the resolution may be determined according to a pitch between the channels C1, C2 . . . and Cn and the number of channels C1, C2 . . . and Cn. That is, the scan range and the resolution may depend on the specific array of the channels C1, C2 . . . and Cn formed on a surface of the meta-surface 140. The meta-surface based 1D scanner 150 includes a base substrate 130, the meta-surface 140, and a power supply 120. The power supply 120 is connected to the channels C1, C2 . . . and Cn of the meta-surface 140. In FIG. 1, it is depicted as that the power supply 120 is commonly connected to the channels C1, C2 . . . and Cn. However, this is for convenience of drawing, and as a practical matter, the power supply 120 may be individually connected to each of the channels C1, C2 . . . and Cn, which will be described below with respect to an exemplary embodiment. The power supply 120 may be, for example, an AC (alternating current) power supply. Referring to FIG. 2, the meta-surface 140 is arranged on the base substrate 130. The base substrate 130 supports the meta-surface 140 and is in contact with a lower surface of the meta-surface 140. Referring to FIG. 1, the channels C1, C2 . . . and Cn are arranged in the x-axis direction. The type of each of the channels C1, C2 . . . and Cn may be the same. Each of the channels C1, C2 . . . and Cn extends in a direction perpendicular to the array direction, that is, in a y-axis direction. Each of the channels C1, C2 . . . and Cn includes one long channel in the y-axis direction and a plurality of short channels in the x-axis direction.

FIG. 2 is a lateral view (in the y-axis direction) of the base substrate 130 and the meta-surface 140 of the meta-surface based 1D scanner 150 of FIG. 1.

Referring to FIG. 2, the base substrate 130 and the meta-surface 140 constitute a stacked structure 270 in which the base substrate 130 and the meta-surface 140 are sequentially stacked. The meta-surface 140 has a thickness smaller than that of the base substrate 130.

Figure 3:
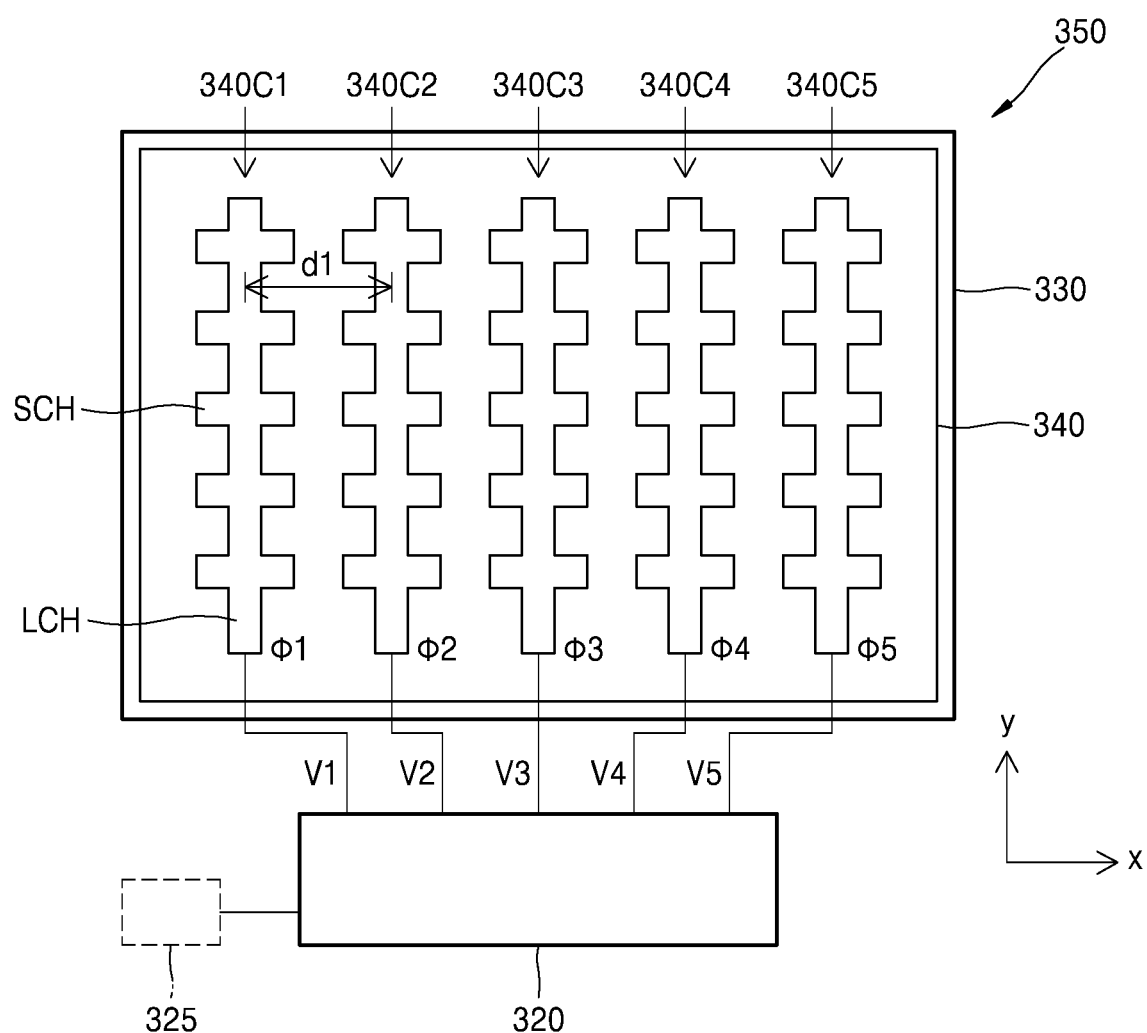
FIG. 3 is a plan view of a meta-surface based 1D scanner of a hybrid 2D scanner system, according to an exemplary embodiment.

FIG. 3 is a plan view of a meta-surface based 1D scanner 350 of the hybrid 2D scanner system 100 according to an exemplary embodiment. The meta-surface based 1D scanner 350 depicted in FIG. 3 is exemplary of the meta-surface based 1D scanner 150 of FIG. 1.

Referring to FIG. 3, the meta-surface based 1D scanner 350 may include a base substrate 330, a meta-surface 340, and a power supply 320. The power supply 320 may be an AC power supply that may apply different voltages to different ones of a plurality of channels. The power supply 120 of FIG. 1 may be the same as the power supply 320. Materials for the base substrate 330 and the meta-surface 340 respectively may be the same materials as described above with respect to the base substrate 130 and the meta-surface 140. The meta-surface 340 includes first through fifth channels 340C1, 340C2, 340C3, 340C4, and 340C5. The number of channels is not limited to five. All of the first through fifth channels 340C1 through 340C5 are arranged parallel to each other in an x-axis direction and are separated from each other. A pitch dl of the first through fifth channels 340C1 through 340C5 may be constant. The smaller the pitch dl, the larger the range of reflection angle of light reflected at a surface of the meta-surface 340, as a result, a field of scanning view may be increased. That is, a scanning region may be increased. Also, as the number of channels is increased, a compact scanning may be achieved, thereby increasing resolution. The first through fifth channels 340C1 through 340C5 may be independently connected to the power supply 320. When the meta-surface based 1D scanner 350 is operated, first through fifth voltages V1 through V5 may be applied to each of the first through fifth channels 340C1 through 340C5, respectively, from the power supply 320. If the number of channels is increased, the first through fifth voltages V1 through V5 may be repeatedly applied to the channels by grouping the increased channels into groups of 5 channels. Also, first through third voltages V1 through V3 may be applied to each of the first through third channels 340C1 through 340C3 and the first through third voltages V1 through V3 may be repeatedly applied with respect to the remaining channels. For example, the first voltage V1 may be applied to the forth channel 340C4, the second voltage V2 may be applied to the fifth channel 340C5, and the third voltage V3 may be applied to an added next channel. If three channels are added, the first through third voltages V1 through V3 may be applied to each of the added channels.

The magnitude of the first through fifth voltages V1 through V5 may be different from each other. Since these voltages are applied to the first through fifth channels 340C1 through 340C5, the first through fifth channels 340C1 through 340C5 respectively may have first through fifth phases $\Phi 1$ through $\Phi 5$. The first through fifth phases $\Phi 1$ through $\Phi 5$ may be different from each other. Due to the different phases, light incident with the same incident angle may be reflected by the first through fifth channels 340C1 through 340C5 at different reflection angles. The incident light may be, for example, polarized light. Each of the channels may include a relatively long channel LCH extending in the y-axis direction and a plurality of short channels SCH that extend in the x-axis direction and are shorter than the long channel LCH. The plurality of the short channels SCH may have the same length as each other and may perpendicular to the long channel LCH.

A voltage controller 325 may be connected to the power supply 320. The voltage controller 325 may control the voltages applied from the power supply 320 to each of the first through fifth channels 340C1 through 340C5. The voltage controller 325 may be arranged in the power supply 320.

Figure 4:
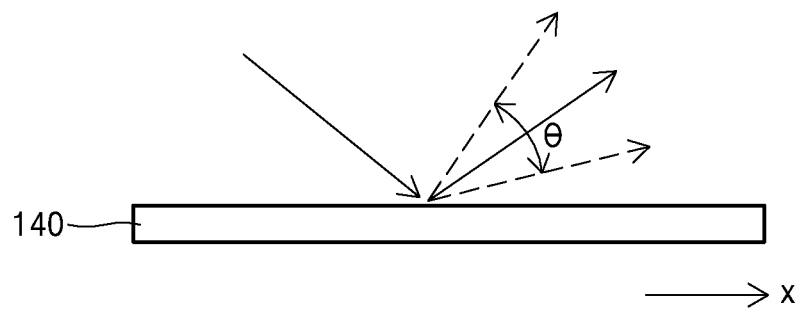
FIG. 4 is a lateral view showing reflection of light incident on a metal-surface of FIG. 1.

FIG. 4 is a lateral view showing the reflection of light incident on the metal-surface 140 of FIG. 1. Incident light is reflected within a given reflection angle θ. As described with reference to FIG. 3, the range of the reflection angle θ may vary according to the phase difference between the first through fifth channels 340C1 through 340C5 formed on the meta-surface 340 and the pitch dl between the first through fifth channels 340C1 through 340C5. The range of the reflection angle θ may be, for example, a range that ensures a horizontal field of view greater than 50 degrees. Also, according to the specific array of the channels, a fine scan may be performed in a range of scanning degrees from 0.5° to 0.1°, thereby increasing resolution.

Figure 5:
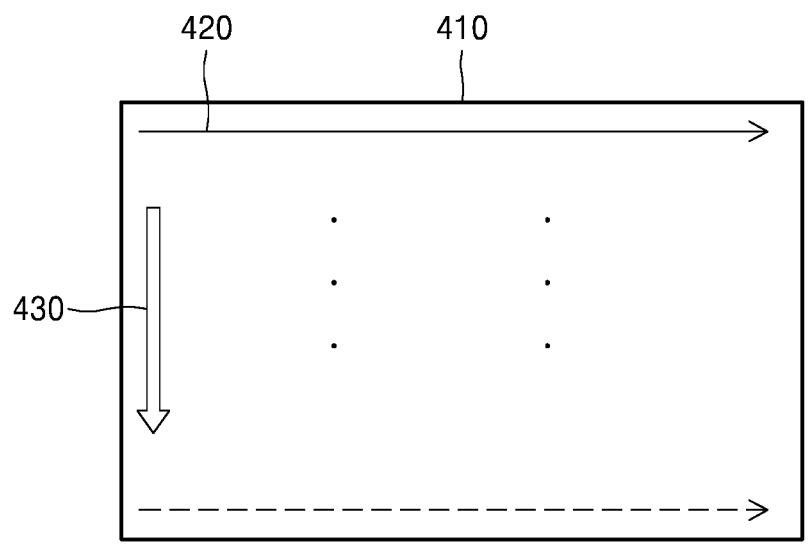
FIG. 5 is a diagram showing a process of scanning a scanning region by using a hybrid meta-surface based 2D scanner system, according to an exemplary embodiment.

FIG. 5 is a diagram showing a process of scanning a scanning region 410 by using the hybrid meta-surface based 2D scanner system 100 according to an exemplary embodiment.

Referring to FIG. 5, the scanning of the scanning region 410 may include horizontal direction scanning 420, along a wider dimension of the scanning region 301, and longitudinal direction scanning 430, along a narrower dimension of the scanning region 410. The horizontal direction scanning 420, along the wider dimension of the scanning region 301, may be performed using the meta-surface based 1D scanner 150 (refer to FIG. 1). The longitudinal direction scanning 430, along the narrower dimension of the scanning region 301, may be performed using the mechanical scanner 110 (refer to FIG. 1). The meta-surface based 1D scanner 150 and the mechanical scanner 110 may be simultaneously operated. That is, the longitudinal direction scanning 430 may be performed using the mechanical scanner 110 while, at the same time, performing the horizontal direction scanning 420 using the meta-surface based 1D scanner 150. In this manner, the entire 2D scanning region 410 may be scanned. Since the meta-surface based 1D scanner 150 having a relatively high scanning speed is used for the horizontal direction scanning 420 and the mechanical scanner 110 having a relatively slow scanning speed is used for the longitudinal direction scanning 430, the overall scanning speed is faster than when a mechanical scanner of the related art is used for both horizontal and longitudinal directions. Also, a scanning region and resolution may be controlled according to the number of channels and a pitch between the channels formed on the meta-surface based 1D scanner 150.

Figure 6:
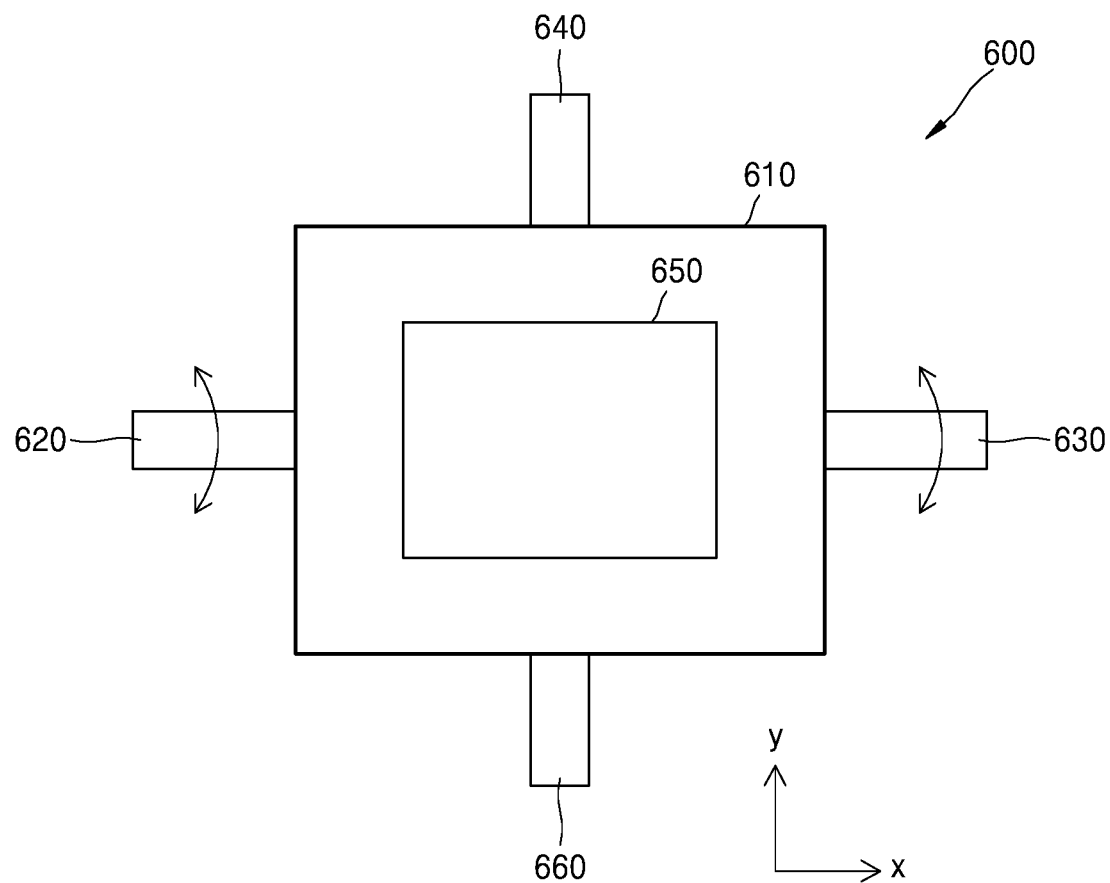
FIG. 6 is a plan view of a hybrid 2D scanner system according to an exemplary embodiment.

FIG. 6 is a plan view of a hybrid 2D scanner system 600 according to an exemplary embodiment.

Referring to FIG. 6, the hybrid 2D scanner system 600 includes a meta-surface based 1D scanner 650 and additional elements. The additional elements may include a mechanical scanner and the moving part of a 2-axes related art MEMS optical scanner. The meta-surface based 1D scanner 650 may be, for example, the meta-surface based 1D scanner 350 of FIG. 3. The additional elements may also include a supporting plate 610 and first through fourth axes 620, 630, 640, and 660 connected to the supporting plate 610. The first and second axes 620 and 630 may, together, form a first rotational axis of the supporting plate 610, and the third and fourth axes 640 and 660 may, together, form a second rotational axis of the supporting plate 610. The first and second rotational axes are perpendicular to each other. The first axis 620 and 630 may be rotated according to a given method, for example, an electromagnetic method. The second axis 640 and 660 may be rotated according to another method, for example, electrostatic method. In the case of the hybrid 2D scanner system 600 according to the current embodiment, only the first axis 620 and 630 rotates, and the second axis 640 and 660 is fixed. This state may be obtained by stopping the second axis 640 and 660 in an operation process of the hybrid 2D scanner system 600. Accordingly, the supporting plate 610 may rotate within a given range in left and right directions with respect to the first axis 620 and 630. The meta-surface based 1D scanner 650 is arranged on the supporting plate 610.

Figure 7:
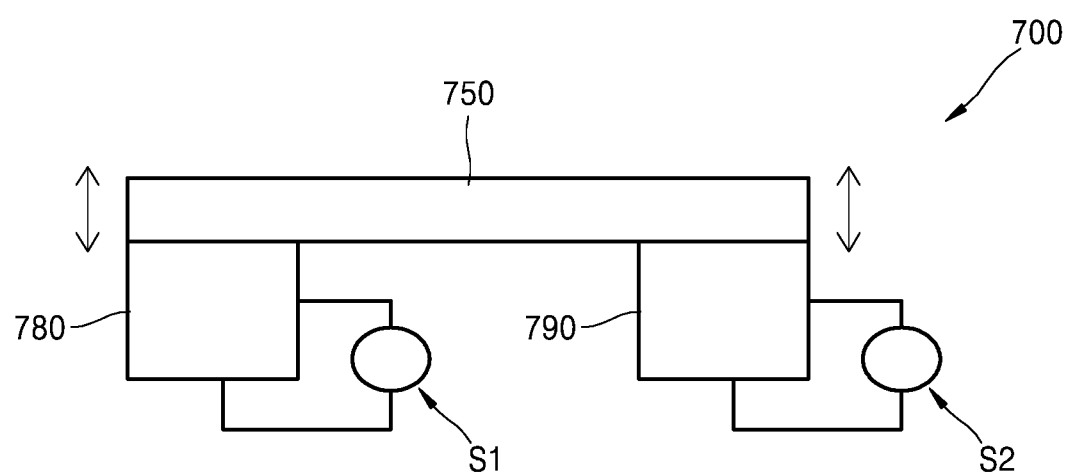
FIG. 7 is a cross-sectional view of a hybrid 2D scanner system according to an exemplary embodiment.

FIG. 7 is a cross-sectional view of a hybrid 2D scanner system 700 according to an exemplary embodiment.

Referring to FIG. 7, the hybrid 2D scanner system 700 may include a meta-surface based 1D scanner 750 and additional elements. The meta-surface based 1D scanner 750 may be the meta-surface based 1D scanner 150 of FIG. 1 or the meta-surface based 1D scanner 350 of FIG. 3. The additional elements may include a mechanical scanner part including a piezoelectric material. The additional elements may also include a first piezoelectric material 780 and a first power supply S1 and a second piezoelectric material 790 and a second power supply S2. The first and second piezoelectric materials 780 and 790 are separated from each other. The first piezoelectric material 780 is attached to an edge of a lower surface of the meta-surface based 1D scanner 750. The second piezoelectric material 790 is attached to another edge of the lower surface of the meta-surface based 1D scanner 750. The first power supply S1 is connected to the first piezoelectric material 780. When a voltage is applied to the first piezoelectric material 780 by the first power supply S1, the volume of the first piezoelectric material 780 may increase or decrease. The second power supply S2 is connected to the second piezoelectric material 790. When a voltage is applied to the second piezoelectric material 790 by the second power supply S2, the volume of the second piezoelectric material 790 may increase or decrease. The voltage application by the first and second power supplies S1 and S2 with respect to the first and second piezoelectric materials 780 and 790 may be performed so that the increase and decrease in the volumes of the first and second piezoelectric materials 780 and 790 are opposite to each other.

Figure 8:
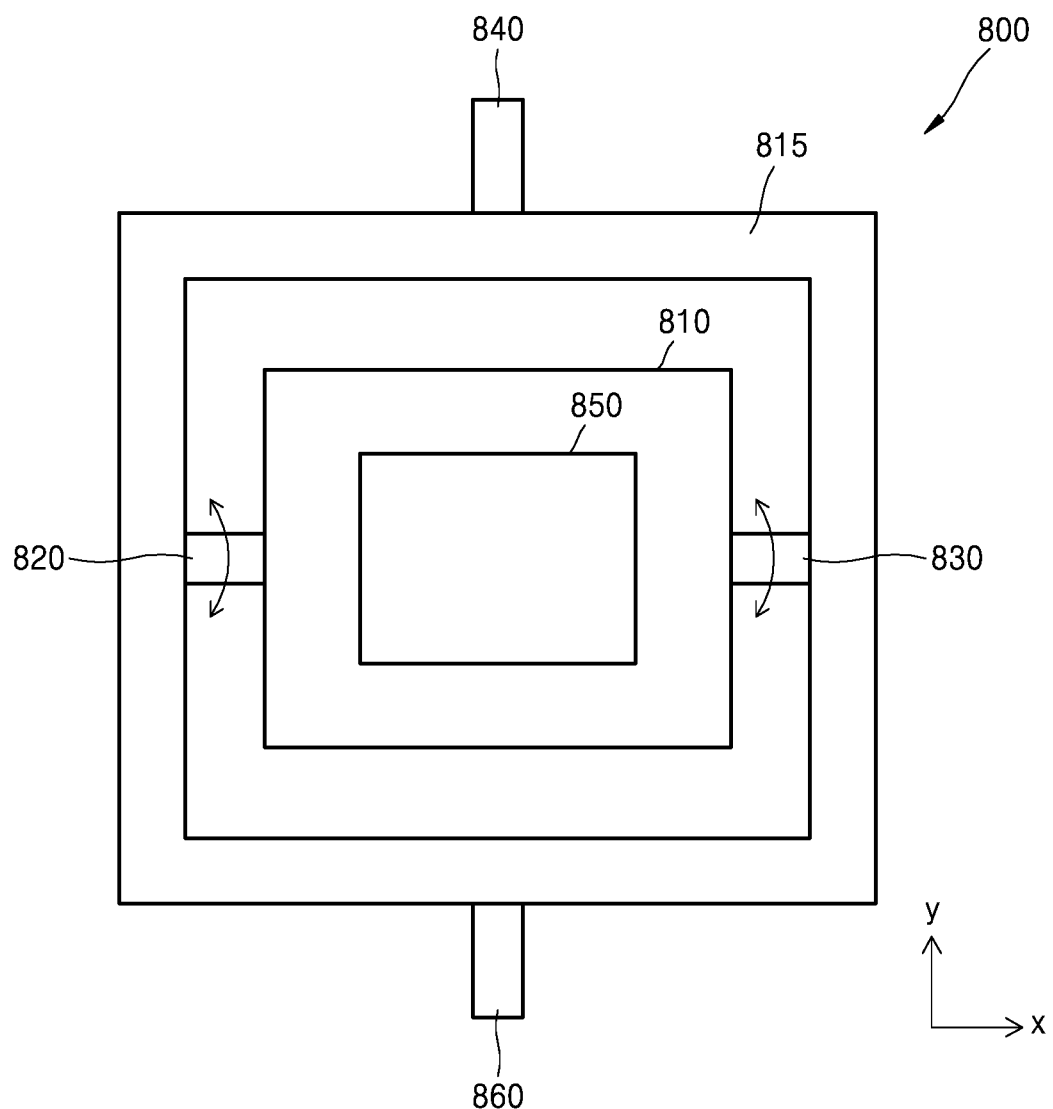
FIG. 8 is a plan view of a hybrid 2D scanner system according to an exemplary embodiment.

FIG. 8 shows a hybrid 2D scanner system 800 according to an exemplary embodiment.

Referring to FIG. 8, the hybrid 2D scanner system 800 may include a meta-surface based 1D scanner 850 and additional elements. The meta-surface based 1D scanner 850 may be the meta-surface based 1D scanner 150 of FIG. 1 or the meta-surface based 1D scanner 350 of FIG. 3. The additional elements may include a related art moving part of a mechanical actuator that uses a Lorentz force.

The additional elements may also include a first moving plate 810 and a second moving plate 815. The first and second moving plates 810 and 815 are separated from each other. The first moving plate 810 is arranged on an inner side of the second moving plate 815. The second moving plate 815 surrounds the first moving plate 810. First rotational axes 820 and 830 are provided between the first and second moving plates 810 and 815. The first and second moving plates 810 and 815 are connected to each other by the first rotational axes 820 and 830. The first rotational axes 820 and 830 are parallel to an x-axis. The first moving plate 810 may be rotated in left and right directions with respect to the x-axis by the rotation of the first rotational axes 820 and 830. A meta-surface based 1D scanner 850 is arranged on the first moving plate 810. Second rotational axes 840 and 860 are provided on an outside of the second moving plate 815. The second rotational axes 840 and 860 are arranged perpendicular to the first rotational axes 820 and 830. The second rotational axes 840 and 860 are parallel to a y-axis. In the hybrid 2D scanner system 800 according to the current embodiment, the second rotational axes 840 and 860 may be fixed. The fixed state of the second rotational axes 840 and 860 may be obtained by stopping the second rotational axes 840 and 860 in an operation of the hybrid 2D scanner system 800.

According to this exemplary embodiment the first rotational axes 820 and 830 are rotated. Accordingly, a 2D scanning in the x and y directions may be achieved by the scanning of the meta-surface based 1D scanner 850 and the rotation of the first rotational axes 820 and 830.

The hybrid 2D scanner according to an exemplary embodiment is structured by a combination of a meta-surface based 1D scanner that is operated at a high speed and a mechanical scanner that is operated at a comparatively low speed, and thus, a configuration thereof is relatively simple. In a scanning region, a wide width direction (in an x-axis direction) of the scanning region is scanned by using the meta-surface based 1D scanner and a comparatively narrow width direction (in a y-axis direction) of the scanning region is scanned by using the mechanical scanner. Accordingly, the scanning speed of the hybrid meta-surface 2D scanner according to the current embodiment is faster than a scanning method in which mechanical scanners are used to scan both directions of the scanning region. When the hybrid 2D scanner is applied to a LiDAR system, in particular, to an autonomous driving system, the hybrid 2D scanner system may be stably operated while rapidly acquiring external information even in a difficult environment.

While one or more exemplary embodiments have been described with reference to the figures, it will be understood by those of ordinary skill in the art that various changes in form and details may be made therein without departing from the spirit and scope as defined by the following claims.

What is claimed is:

1. A hybrid two-dimensional (2D) scanner system comprising:

a meta-surface based one-dimensional (1D) scanner comprising:
  a base substrate;
  a meta-surface that is disposed on the base substrate and comprises a channel array; and
a mechanical scanner connected to the meta-surface based 1D scanner.

2. The hybrid 2D scanner system of claim 1, wherein the meta-surface based 1D scanner further comprises:
  a power supply configured to apply a voltage to the channel array.

3. The hybrid 2D scanner system of claim 2, wherein the channel array comprises a plurality of channels, and wherein the power supply is configured to apply a voltage to each of the plurality of channels individually.

4. The hybrid 2D scanner system of claim 2, wherein the power supply comprises a voltage controller.

5. The hybrid 2D scanner system of claim 3, wherein each of the plurality of channels comprises:
  a first channel; and
  a plurality of second channels that are perpendicular to the first channel, wherein a length of each of the plurality of second channels is shorter than a length of the first channel.

6. The hybrid 2D scanner system of claim 1, wherein the mechanical scanner comprises a first rotational axis and a second rotational axis, wherein one of the first rotational axis and the second rotational axis is fixed.

7. The hybrid 2D scanner system of claim 1, wherein the mechanical scanner is an actuator comprising a piezoelectric material.

8. The hybrid 2D scanner system of claim 6, wherein the mechanical scanner is a micro electromechanical system type mechanical scanner comprising an electromagnetic actuator and an electrostatic actuator.

9. The hybrid 2D scanner system of claim 6, wherein the mechanical scanner is a micro electromechanical system type mechanical scanner comprising an actuator configured to operate according to a Lorentz force.

10. A method of operating a hybrid two-dimensional (2D) scanner system, the method comprising:
  operating a meta-surface based one-dimensional (1 D) scanner; and
  operating a mechanical scanner connected to the meta-surface based 1D scanner,
  wherein the mechanical scanner comprises a first rotational axis and a second rotational axis, wherein one of the first rotational axis and the second rotational axes is stopped to use the mechanical scanner as a 1D scanner, and
  wherein the meta-surface based 1D scanner comprises a base substrate and a meta-surface that is disposed on the base substrate and comprises a channel array.

11. The method of claim 10, wherein the meta-surface based 1D scanner further comprises:
  a power supply configured to apply a voltage to the channel array.

12. The method of claim 11, wherein the channel array comprises a plurality of channels, and wherein the power supply is configured to apply a voltage to each of the plurality of channels individually.

13. The method of claim 12, further comprising:
  the power supply applying a first voltage to at least one first channel of the plurality of channels and applying a second voltage, different from the first voltage to at least one second channel of the plurality of channels.

14. The method of claim 12, wherein each of the plurality of channels comprises:
  a first channel; and
  a plurality of second channels that are perpendicular to the first channel, wherein a length of each of the plurality of second channels is shorter than a length of the first channel.

15. The method of claim 10, wherein the mechanical scanner comprises a first rotational axis and a second rotational axis, and
  wherein the operating the mechanical scanner comprises rotating the first rotational axis and maintaining the second rotational axis in a fixed position.

16. The method of claim 10, wherein the mechanical scanner is an actuator comprising a piezoelectric material.

17. The method of claim 15, wherein the mechanical scanner is a micro electromechanical system type mechanical scanner comprising an electromagnetic actuator and an electrostatic actuator.

18. The method of claim 15, wherein the mechanical scanner is a micro electromechanical system type mechanical scanner comprising an actuator configured to operate according to a Lorentz force.

\* \* \* \* \*